E. W. PRAGST.
ELECTRICAL SYSTEM.
APPLICATION FILED JULY 30, 1920.

Inventor:
Ernest W. Pragst,
by his Attorney.

UNITED STATES PATENT OFFICE.

ERNEST W. PRAGST, OF SCHENECTADY, NEW YORK, ASSIGNOR TO GENERAL ELECTRIC COMPANY, A CORPORATION OF NEW YORK.

ELECTRICAL SYSTEM.

1,378,557.  Specification of Letters Patent.  Patented May 17, 1921.

Application filed July 30, 1920. Serial No. 399,985.

*To all whom it may concern:*

Be it known that I, ERNEST W. PRAGST, a citizen of the United States, residing at Schenectady, in the county of Schenectady, State of New York, have invented certain new and useful Improvements in Electrical Systems, of which the following is a specification.

My invention relates to electrical systems of transmission and distribution, and has for its object an improved method and apparatus for suppressing grounds or earth faults which may occur in the system.

More particularly my invention relates to systems of distribution having a grounded neutral connection and which has a reactance coil in the ground connection for suppressing the flow of unbalanced current should a fault develop.

In systems having a grounded neutral, it has been the practice under certain conditions to insert reactance in the grounded connection to suppress the flow of unbalanced current through the neutral connection. The use of such reactance however interferes with the proper functioning of the selecting relays which are now very generally employed in large systems of distribution for cutting out feeders should a permanent fault develop, such as occurs when an insulator becomes broken out on the line.

In the practice of my invention the disadvantages heretofore attending the use of such reactance are avoided, for I not only so proportion the reactor employed to the constants of the circuit in such a manner as to reduce the current flowing into a fault to a minimum, but in addition provide means for short circuiting the reactor and thereby dead grounding the neutral in order to permit the selecting relays to function whenever a fault persists beyond a predetermined length of time.

For a more complete understanding of the nature and objects of my invention, reference should be had to the following detailed description when taken in connection with the accompanying drawing in which.

Figure 1:
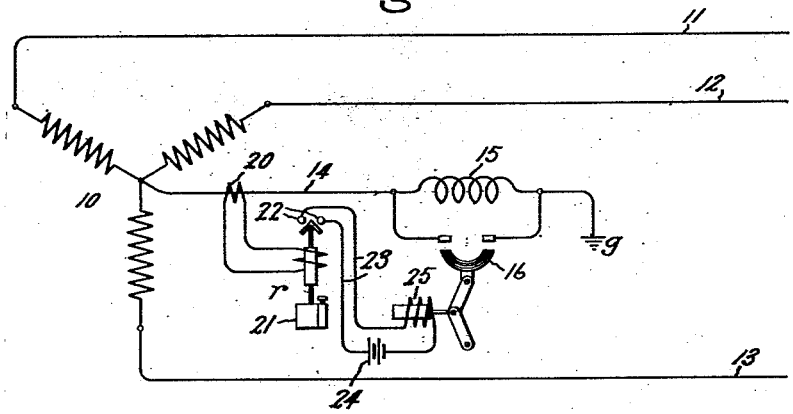
Figure 1 shows diagrammatically a system of distribution having a reactor arranged in the ground connection in accordance with my invention.

Referring now to the drawing, 10 represents a Y-connected source of alternating current, such as a generator or the secondaries of Y-connected transformers. The source 10 is shown as connected to supply electrical energy to the buses or feeders 11, 12 and 13 of a three phase distributing system. The connection 14 runs from the neutral point of the source 10 to ground as indicated at $g$. In series with the connection 14, and between the neutral point of source 10 and ground $g$, is the reactance coil 15, which is adapted to be short circuited by the normally open switch 16, connected in shunt with the coil 15, in order to connect directly to ground the neutral of the system.

The switch 16 may be closed by any convenient means adapted to this end which responds to a current in the connection 14 that persists for a period of time determined by the operator. The means shown for the purpose of illustration comprises a retarded relay $r$ connected to respond to current in the connection 14 through the current transformer 20. The relay $r$ is shown as provided with a dash pot 21 as the retarding device, which may be set so that the relay will respond to a current that has persisted in connection 14 for any desired predetermined period of time, for instance a half second. The relay $r$ bridges the contacts 22 of an auxiliary circuit 23 supplied with electric energy from source 24 to close the circuit and energize the trip coil 25 which actuates the switch 16 to short circuit the coil 15.

The coil 15, where my invention is practised, is proportioned to have a reactance which substantially neutralizes the capacitance to ground of the buses and feeders of the system supplied by source 10. This will be clearly comprehended by reference to Fig. 2 where the capacitance to ground of feeders 11 and 12 is diagrammatically depicted by the condensers 31 and 32 shown as connected in shunt with the feeders to ground. The feeder 13 is depicted as having developed an arc to ground at A; hence the capacitance of this feeder to ground during the persistence of this fault is substantially zero, and no condenser is therefore shown for this feeder. Capacity current will flow during the persistence of the fault from the feeders 11 and 12 by way of the condensers 31 and 32, as indicated by arrows $a$ and $b$, into the fault A; which current is a leading current leading the E. M. F. by substantially 90° electrically. Reactive current will at the same time flow from feeder 13 into the fault at A, as indicated by the arrow $c$. This current flows back to the system by way of the ground connection and the reactive coil 15, as indicated by the arrow $c'$.

The reactive current will be a lagging current, lagging behind the E. M. F. by substantially 90° electrically. If the coil 15 has its reactance proportioned as previously stated, then the reactive current flowing through the fault at A will be substantially equal and opposite to the capacity current which flows through the same fault so that no arc occurs at the fault beyond that entailed by the negligible power components of these currents. The neutralizing action of these currents flowing through the fault at A is symbolically indicated by the arrows $a''$ and $c''$, which have opposite directions.

Figure 2:
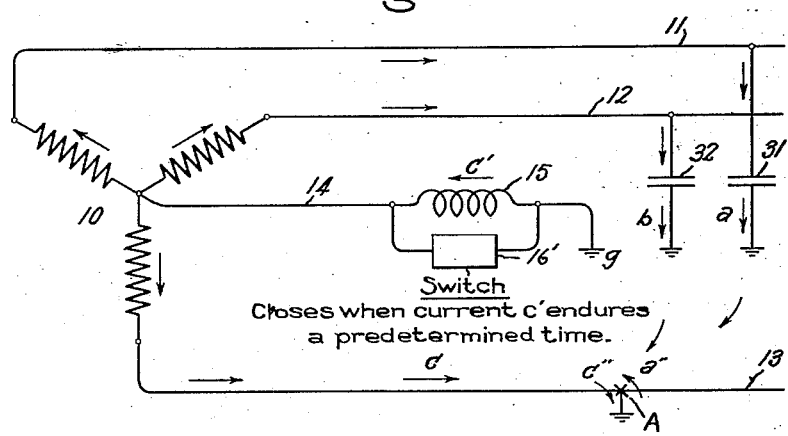
Fig. 2 is a view similar to Fig. 1 but still more diagrammatic, illustrating the function of the reactor during the occurrence of a fault.

Should, however, the fault at A persist beyond the predetermined period of time chosen, that is the half second in the instance mentioned, the short circuiting means for coil 15, symbolically depicted in Fig. 2 at 16', will function so that the system is then directly connected to ground without the intervention of coil 15, or "dead grounded" as it is frequently termed. When the system is thus dead grounded, the selecting relays with which systems such as I have described are usually provided, but which I have not shown as they form no part of my present invention, will be permitted properly to function in order to cut out the feeder supplying the fault.

While I have here shown a Y-connected system of electrical transmission, or distribution as the case may be, which has grounded reactance connected to its neutral point arranged to be short circuited in accordance with my invention, it will be apparent to those skilled in the art that the application of my invention is not limited to Y-connected systems but may be applied to any system having a neutral which is to be grounded.

Having now described an embodiment of my invention which is at present the best means known to me for carrying the same into effect, I would have it understood that this is merely illustrative and that I do not mean to be limited thereby to the precise details shown, nor restricted in the choice of recognized equivalents except as defined in my claims hereunto annexed.

What I claim as new and desire to secure by Letters Patent of the United States, is:—

1. The method of protecting systems of electrical transmission and distribution which consists in connecting reactance in the connection from the neutral of the system to ground and in short circuiting the same when a fault to ground which has developed in the system endures more than a predetermined period of time.

2. The method of protecting systems of electrical transmission and distribution which consists in connecting reactance in the connection from the neutral of the system to ground proportioning said reactance substantially to neutralize the ground capacitance of said system, and short circuiting said reactance when a fault to ground has developed enduring for more than a predetermined period of time.

3. In a system of electrical transmission and distribution, the combination with a source of electrical energy having a neutral point, of a ground connection leading from said neutral point, a reactor connected in series with said ground connection, and means for short circuiting said reactor in response to currents flowing in said connection which endures more than a predetermined period of time.

4. In a system of electrical transmission and distribution, the combination with a source of electrical energy having a neutral point, of a ground connection leading from said neutral point, a reactor connected in series with said ground connection, a normally open switch arranged to short circuit said reactor, and time delayed actuating means for said switch connected to respond to a current in said connection.

5. In a system of electrical transmission and distribution, the combination with a source of electrical energy having a neutral point, of a ground connection leading from said neutral point, a reactor connected in series with said ground connection, a normally open switch arranged to short circuit said reactor and provided with an actuating winding, and a time delayed relay arranged to respond to currents in said connection which endure beyond a predetermined period of time, said relay being connected to energize said actuating winding.

6. In a system of electrical transmission and distribution, the combination with a source of electrical energy having a neutral point, of a ground connection leading from said neutral point, a reactor connected in series with said ground connection, said reactor being proportioned to have substantially sufficient reactance to neutralize the capacitance to ground in the system, and means for short circuiting said reactor in response to currents flowing in said connection which endure more than a predetermined period of time.

7. In a system of electrical transmission and distribution, the combination with a source of electrical energy having a neutral point, of a ground connection leading from said neutral point, a reactor connected in series with said ground connection, said reactor being proportioned to have reactance substantially equal in value to the ground capacitance of the system, a normally open switch arranged to short circuit said reactor, and time delayed actuating means for said switch connected to respond to a current in said connection.

In witness whereof, I have hereunto set my hand this 29th day of July, 1920.

ERNEST W. PRAGST.